United States Patent
Zan et al.

(10) Patent No.: US 11,509,134 B2
(45) Date of Patent: Nov. 22, 2022

(54) COMMUNICATION INTERFACE PROTECTION CIRCUIT HAVING TRANSIENT VOLTAGE SUPPRESSION

(71) Applicant: Huawei Technologies Co., Ltd., Shenzhen (CN)

(72) Inventors: Chao Zan, Dongguan (CN); Qiming Tang, Shenzhen (CN); Guangrong Zhou, Dongguan (CN); Jun Yan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 678 days.

(21) Appl. No.: 16/360,343

(22) Filed: Mar. 21, 2019

(65) Prior Publication Data

US 2019/0222021 A1 Jul. 18, 2019

Related U.S. Application Data

(63) Continuation of application No. PCT/CN2017/100934, filed on Sep. 7, 2017.

(30) Foreign Application Priority Data

Dec. 23, 2016 (CN) .......................... 201611207683.3

(51) Int. Cl.
*H02H 9/04* (2006.01)
*H04B 3/00* (2006.01)
*H02H 3/20* (2006.01)

(52) U.S. Cl.
CPC ............ *H02H 9/046* (2013.01); *H02H 3/202* (2013.01); *H02H 9/04* (2013.01); *H02H 9/044* (2013.01); *H04B 3/00* (2013.01)

(58) Field of Classification Search
CPC .... G06F 1/16; H02H 9/04; H02H 9/02; H04L 12/10; H03H 7/25; H03H 7/155; H03K 17/74; H04B 1/18; H03F 3/19
See application file for complete search history.

(56) References Cited

U.S. PATENT DOCUMENTS

| 5,706,426 | A | * | 1/1998 | Hsu ........................ G06F 21/123 |
| | | | | 713/185 |
| 6,385,030 | B1 | | 5/2002 | Beene |
| 7,538,997 | B2 | * | 5/2009 | Mallikararjunaswamy ................. |
| | | | | H01L 29/87 |
| | | | | 361/56 |
| 7,795,987 | B2 | * | 9/2010 | Bobde ................... H01L 23/552 |
| | | | | 333/12 |

(Continued)

FOREIGN PATENT DOCUMENTS

| CN | 2703350 | * | 4/2004 |
| CN | 2703350 Y | | 6/2005 |

(Continued)

*Primary Examiner* — Kevin J Comber
*Assistant Examiner* — Nusrat Quddus
(74) *Attorney, Agent, or Firm* — Slater Matsil, LLP

(57) ABSTRACT

An interface protection circuit and a device interface are disclosed. The interface protection circuit includes a capacitor and a transient voltage suppressor (TVS) transistor. A first end of the capacitor is connected to a connection port, a second end of the capacitor is connected to a first end of the TVS transistor and an interface chip, and a second end of the TVS transistor is grounded.

19 Claims, 3 Drawing Sheets

(56) References Cited

U.S. PATENT DOCUMENTS

| | | | |
|---|---|---|---|
| 8,456,138 B2* | 6/2013 | Lei | H05B 41/28 |
| | | | 322/24 |
| 9,742,394 B2* | 8/2017 | Focia | H03K 17/56 |
| 10,062,682 B1* | 8/2018 | Mallikarjunaswamy | |
| | | | H01L 23/535 |
| 10,218,171 B2* | 2/2019 | Zhu | H01L 27/0288 |
| 10,263,416 B2* | 4/2019 | Deng | H02H 3/202 |
| 2006/0120005 A1 | 6/2006 | Van Sickle | |
| 2008/0002316 A1* | 1/2008 | Adkisson | H01L 27/0285 |
| | | | 361/56 |
| 2008/0310065 A1* | 12/2008 | Ho | H01L 27/0676 |
| | | | 361/91.5 |
| 2008/0316773 A1* | 12/2008 | Neubarth | H02M 3/3384 |
| | | | 363/17 |
| 2009/0268361 A1* | 10/2009 | Mallikarjunaswamy | |
| | | | H01L 29/7436 |
| | | | 361/56 |
| 2010/0321840 A1* | 12/2010 | Bobde | H01L 27/0266 |
| | | | 361/56 |
| 2012/0038227 A1* | 2/2012 | West | H01H 9/541 |
| | | | 307/139 |
| 2014/0111895 A1* | 4/2014 | Peng | H02H 9/047 |
| | | | 361/57 |
| 2014/0126089 A1* | 5/2014 | Chang | H02H 3/202 |
| | | | 361/56 |
| 2015/0029634 A1 | 1/2015 | Kang | |
| 2015/0180254 A1* | 6/2015 | Zhao | H02J 7/007182 |
| | | | 320/107 |
| 2015/0207312 A1* | 7/2015 | Wang | H02H 9/046 |
| | | | 361/56 |
| 2016/0013638 A1* | 1/2016 | Glas | H01L 27/0248 |
| | | | 361/56 |
| 2016/0282138 A1* | 9/2016 | Golubovic | H02H 9/04 |
| 2016/0352106 A1* | 12/2016 | Schimel | H02J 7/0031 |
| 2017/0126003 A1* | 5/2017 | Henzler | H02H 9/046 |
| 2018/0159322 A1* | 6/2018 | Zmuda | A61N 1/36125 |
| 2018/0286854 A1* | 10/2018 | Rose | H02H 9/025 |
| 2018/0292720 A1* | 10/2018 | Lu | G02F 1/136204 |
| 2019/0287959 A1* | 9/2019 | Hua | H01L 27/0262 |

FOREIGN PATENT DOCUMENTS

| | | | | |
|---|---|---|---|---|
| CN | 101001016 A | | 7/2007 | |
| CN | 201504099 U | | 6/2010 | |
| CN | 202713356 U | | 1/2013 | |
| CN | 203086120 U | | 7/2013 | |
| CN | 203086131 U | | 7/2013 | |
| CN | 203339687 | * | 7/2013 | |
| CN | 203233162 U | | 10/2013 | |
| CN | 203339687 U | | 12/2013 | |
| CN | 203352163 U | * | 12/2013 | |
| CN | 203352163 U | | 12/2013 | |
| CN | 203423485 U | | 2/2014 | |
| CN | 105244863 | * | 6/2014 | |
| CN | 205123240 U | | 3/2016 | |
| CN | 206790086 U | | 12/2017 | |
| JP | S47027614 A | | 10/1972 | |
| JP | S49065127 A | | 6/1974 | |
| JP | S61224610 A | | 10/1986 | |
| JP | H10243552 A | | 9/1998 | |
| JP | 2005217742 A | | 8/2005 | |
| JP | 2010057332 A | | 3/2010 | |
| KR | 100200469 B1 | | 6/1999 | |
| WO | 2015183399 A1 | | 12/2015 | |
| WO | WO-2016041377 A1 | * | 3/2016 | H02H 9/02 |
| WO | WO-2016127737 A1 | * | 8/2016 | G06K 9/0002 |

* cited by examiner

COMMUNICATION INTERFACE PROTECTION CIRCUIT HAVING TRANSIENT VOLTAGE SUPPRESSION

CROSS-REFERENCE TO RELATED APPLICATIONS

This application is a continuation of International Application No. PCT/CN2017/100934, filed on Sep. 7, 2017, which claims priority to Chinese Patent Application No. 201611207683.3, filed on Dec. 23, 2016. The disclosures of the aforementioned applications are hereby incorporated by reference in their entireties.

TECHNICAL FIELD

The present invention relates to the field of circuit technologies, and in particular, to an interface protection circuit and a device interface.

BACKGROUND

To facilitate communication between two devices, a connection port may be usually disposed in each device, and the connection ports of the two devices are connected by using a connection component, to implement connection between the two devices. The connection component may be a connection cable. The connection component may be a component for implementing a connection between a television and a set top box, a component for implementing a connection between a computer and a display, or the like.

With continuous development of electronic technologies, a data signal between devices has an increasingly high transmission rate. If the data signal between the devices has a relatively high transmission rate, when the devices are connected by using a connection port, relatively strong surge is generated in a circuit. The generated surge may cause damage to an interface chip in the device. In the prior art, to reduce damage caused by the surge to the interface chip, a transient voltage suppressor (TVS) is usually disposed in the device, to protect the interface chip by using the TVS transistor. Currently, to improve a protection capability of the TVS transistor for the interface chip, power of the TVS transistor is usually increased. When the power of the TVS transistor is relatively high, a relatively high parasitic capacitance is generated in the TVS transistor. The parasitic capacitance affects quality of the data signal transmitted between the devices, resulting in relatively poor quality of the data signal transmitted between the devices.

SUMMARY

Embodiments of the present invention provide an interface protection circuit, so as to improve a protection capability for an interface chip while ensuring quality of a data signal transmitted between devices.

According to a first aspect, an embodiment of the present invention provides an interface protection circuit, where the interface protection circuit includes a capacitor and a TVS transistor. A first end of the capacitor is connected to a connection port. A second end of the capacitor is connected to a first end of the TVS transistor and an interface chip. A second end of the TVS transistor is grounded.

When relatively strong surge is generated in the circuit, the capacitor may first filter out a direct current portion in the surge, to reduce energy of the surge. In the foregoing process, a protection capability for the interface chip can be improved without increasing power of the interface protection circuit, so that the protection capability for the interface chip is improved while quality of a data signal transmitted between devices is ensured. Further, the capacitor can reduce the energy of the surge, so that the energy of the surge flowing to the TVS transistor is reduced, and the TVS transistor can be further protected, thereby improving reliability of the interface protection circuit.

In a possible implementation, the interface protection circuit further includes a resistor, and the resistor is connected in series to the capacitor and the interface chip.

Optionally, the resistor may be disposed between the first end of the TVS transistor and the interface chip. In this implementation, the resistor is connected in series to the interface chip, so that voltage division may be performed on the resistor and the interface chip. When relatively strong surge is generated in the circuit, the resistor may reduce surge voltages at both ends of the interface chip, to reduce impact of the surge on the interface chip.

Optionally, the resistor may be disposed between the connection port and the first end of the capacitor. In this possible implementation, when relatively strong surge is generated in the circuit, the resistor and the capacitor may reduce voltages generated because of the surge at both ends of the TVS transistor, thereby improving a protection effect on the TVS transistor, and further improving reliability of the protection circuit.

Optionally, the resistor may be disposed between the second end of the capacitor and the first end of the TVS transistor. In this possible implementation, when relatively strong surge is generated in the circuit, the resistor and the capacitor may reduce voltages generated because of the surge at both ends of the TVS transistor, thereby improving a protection effect on the TVS transistor, and further improving reliability of the protection circuit.

In another possible implementation, there is an inverse relationship between a capacitance value of the capacitor and a frequency of a data signal transmitted on the connection port. Optionally, the capacitance value of the capacitor may be greater than 0.1 nanofarad and less than 1 microfarad. A proper capacitance value is set, so that the capacitor may not only effectively filter out a direct current portion in surge, but also ensure relatively small impact on the data signal transmitted on the connection port.

In another possible implementation, a resistance value of the resistor is between a first resistance value and a second resistance value, and the first resistance value is greater than the second resistance value. Optionally, the first resistance value is greater than 1 ohm, and the second resistance value is less than 200 ohms. A proper resistance value of the resistor is set, so that the resistor can be used to protect the interface chip, and the resistor has relatively small impact on the data signal transmitted on the connection port.

In another possible implementation, a data signal transmitted in the circuit has a frequency higher than 500 MHz. When the frequency of the data signal is relatively high, most of energy of the data signal is an alternating component. In this way, in a process in which the connection port stably sends a data signal to the interface chip, the capacitor may have relatively small impact on the data signal.

In another possible implementation, a clamping voltage of the TVS transistor is greater than a maximum voltage of a data signal transmitted on the connection port. Optionally, the TVS transistor may be a unidirectional TVS transistor or a bidirectional TVS transistor. When the TVS transistor is a unidirectional TVS transistor, correspondingly, a negative electrode of the TVS transistor is connected to the connection port.

According to a second aspect, an embodiment of the present invention further provides a device interface, where the device interface includes an interface chip and the interface protection circuit according to the first aspect or any possible implementation of the first aspect.

According to the interface protection circuit and the device interface provided in the embodiments of the present invention, the capacitor and the TVS transistor are disposed in the interface protection circuit, and the capacitor is located between the connection port and the TVS transistor. In the foregoing process, a protection capability for the interface chip can be improved without increasing power of the interface protection circuit, so that the protection capability for the interface chip is improved while quality of a data signal transmitted between devices is ensured. Further, the capacitor can reduce the energy of the surge, so that the energy of the surge flowing to the TVS transistor is reduced, and the TVS transistor can be further protected, thereby improving reliability of the interface protection circuit.

DETAILED DESCRIPTION OF ILLUSTRATIVE EMBODIMENTS

Figure 1:
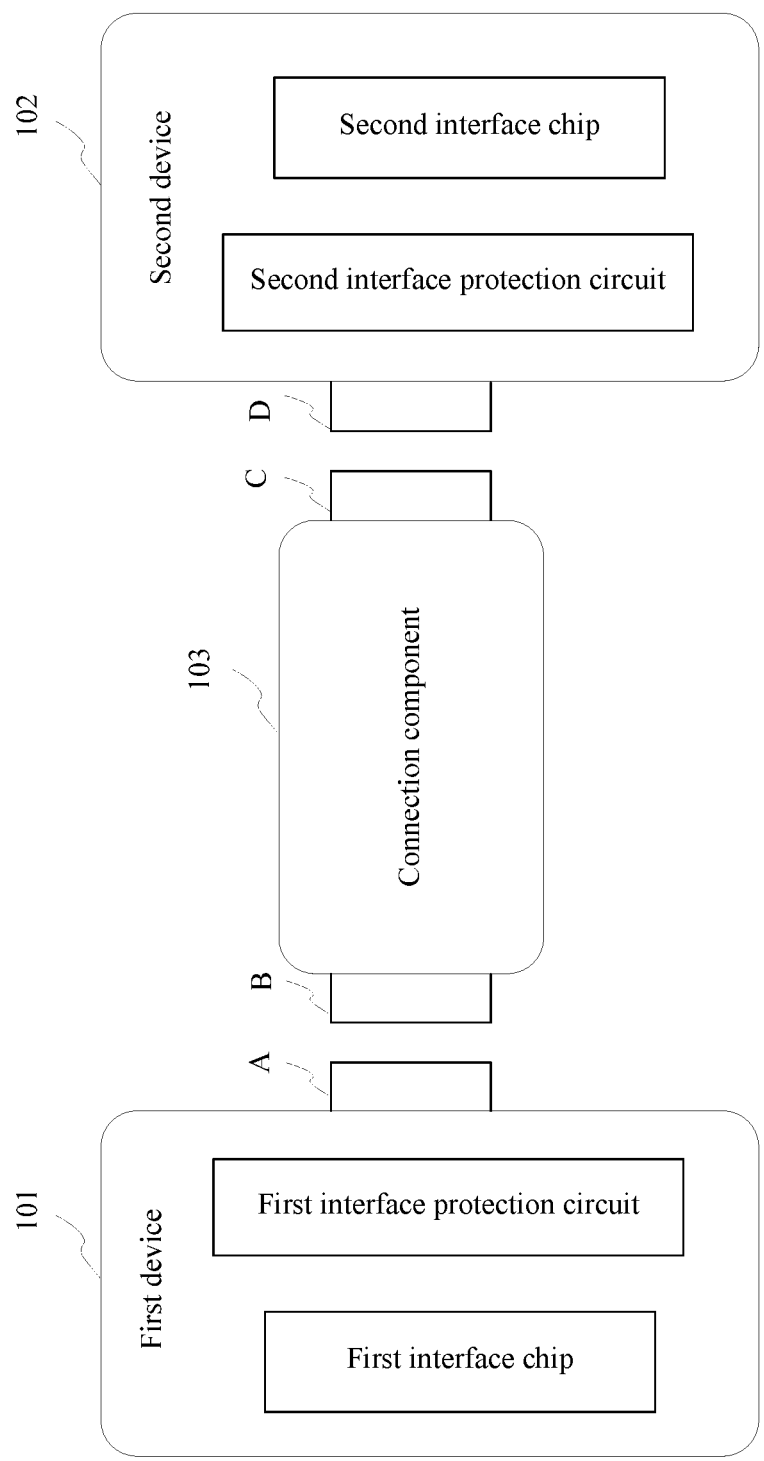
FIG. 1 is a schematic diagram of an application scenario of an interface protection circuit according to the present invention.

FIG. 1 is a schematic diagram of an application scenario of an interface protection circuit according to the present invention. Referring to FIG. 1, the interface protection circuit includes a first device 101, a second device 102, and a connection component 103. A first interface chip, a first interface protection circuit, and a connection port A are disposed in the first device 101. A second interface chip, a second interface protection circuit, and a connection port D are disposed in the second device 102. A connection port B and a connection port C are disposed in the connection component 103. Optionally, the first device 101 may be a computer, and correspondingly, the second device 102 may be a display. Optionally, the first device 101 may be a television, and correspondingly, the second device 102 may be a set top box. Certainly, the connection component 103 and the first device 101 or the second device 102 may be an integrated device. When the connection component 103 and the first device 101 are an integrated device, the connection component 103 and the first device 101 may be removable disks. Optionally, the connection component 103 may be a connection cable, or the like.

The first device 101 can be connected to the second device 102 by using the connection component 103. When the first device 101 needs to be connected to the second device 102, the connection port A of the first device 101 may be connected to the connection port B of the connection component 103, and the connection port D of the second device 102 may be connected to the connection port C of the connection component 103.

After the first device 101 is connected to the second device 102 by using the connection component 103, communication between the first device 101 and the second device 102 may be implemented by using the first interface chip, the first interface protection circuit, the connection component 103, the second interface protection circuit, and the second interface chip. When the first device 101 sends data to the second device 102, the second interface chip may be protected by using the second interface protection circuit. When the second device 102 sends data to the first device 101, the first interface chip may be protected by using the first interface protection circuit.

It should be further noted that interface protection circuits in all devices have similar structures. Using a structure of an interface protection circuit in any device as an example, the following describes in detail the interface protection circuit shown in this application based on specific embodiments. The following specific embodiments may be mutually combined, and same or similar concepts or processes may not be repeatedly described in some embodiments.

Figure 2:
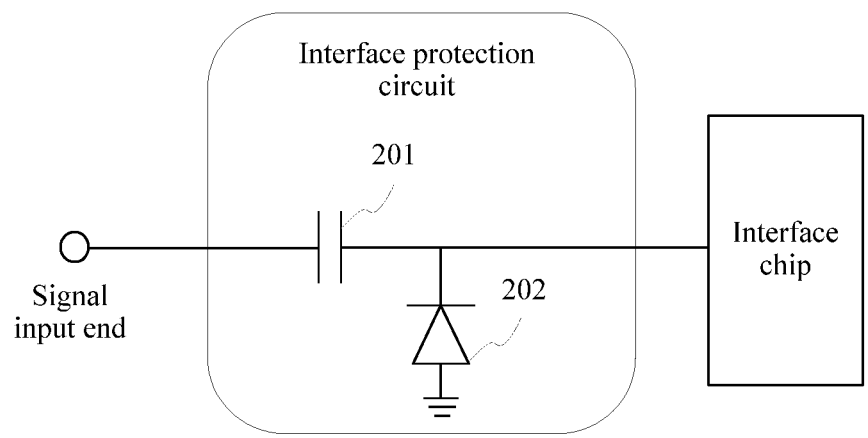
FIG. 2 is schematic structural diagram 1 of an interface protection circuit according to the present invention.

FIG. 2 is schematic structural diagram 1 of an interface protection circuit according to the present invention. The interface protection circuit is disposed in a protected device. Referring to FIG. 2, the circuit may include a capacitor 201 and a TVS transistor 202. A first end of the capacitor 201 is connected to a connection port of the protected device. A second end of the capacitor 201 is connected to a first end of the TVS transistor 202 and an interface chip of the protected device. A second end of the TVS transistor 202 is grounded.

Optionally, the TVS transistor 202 in this application may be a unidirectional TVS transistor or a bidirectional TVS transistor. It should be noted that the TVS transistor 202 shown in FIG. 2 is a unidirectional TVS transistor. When the TVS transistor 202 is the unidirectional TVS transistor, a negative electrode of the TVS transistor 202 is connected to the connection port. Alternatively, when the TVS transistor 202 is the bidirectional TVS transistor, either electrode of the TVS transistor 202 may be connected to the connection port.

Optionally, a capacitance value of the capacitor 201 is related to a frequency of a data signal transmitted on the connection port. A higher frequency of the data signal may indicate a smaller capacitance value of the capacitor 201. Optionally, the capacitance value of the capacitor 201 may be between 0.1 nanofarad and 1 microfarad. In this way, the capacitor may not only effectively filter out a direct current portion in surge, but also ensure relatively small impact on the data signal transmitted on the connection port. Optionally, there may be an inverse relationship between the capacitance value of the capacitor 201 and the frequency of the data signal transmitted on the connection port. Optionally, the data signal transmitted on the connection port may be sent by the connection port to the interface chip, or may be sent by the interface chip to the connection port.

In this application, a clamping voltage of the TVS transistor 202 is greater than a maximum voltage of the data signal transmitted on the connection port. When voltages at both ends of the TVS transistor 202 are greater than the clamping voltage, an impedance of the TVS transistor 202 instantly becomes lower, so that the TVS transistor 202 is conductive. When voltages at both ends of the TVS transistor 202 are less than the clamping voltage, an impedance of the TVS transistor 202 instantly becomes higher, and consequently the TVS transistor 202 is non-conductive.

The following describes in detail a working process of the interface protection circuit shown in the embodiment in FIG. 2.

In an actual application process, relatively strong surge may be generated in the protected device in a plurality of scenarios, for example, in a scenario in which the protected device is connected to another device, or in a scenario in which a data signal starts to be transmitted between a protected circuit and another device. When relatively strong surge is generated in the protected device, the surge first passes through the capacitor 201, and the capacitor 201 can filter out a direct current portion in the surge, to reduce energy of the surge. After the capacitor 201 filters out the direct current portion in the surge, the surge still has relatively strong energy. Consequently, voltages generated because of the surge at both ends of the TVS transistor are greater than the clamping voltage of the TVS transistor 202. Therefore, the impedance of the TVS transistor 202 instantly becomes extremely low, so that the TVS transistor 202 is conductive. The TVS transistor 202 is connected in parallel to the interface chip, and the impedance of the TVS transistor 202 is extremely low. Therefore, the surge does not flow to the interface chip, but flows to the TVS transistor 202. After the surge flows to the TVS transistor, the surge passes through the TVS transistor 202 and then is grounded, so that most of the energy of the surge is grounded. In this case, the TVS transistor 202 clamps the voltages at both ends of the TVS transistor 202 to a relatively low voltage. The interface chip is connected in parallel to the TVS transistor 202. Therefore, voltages at both ends of the interface chip are equal to the voltages at both ends of the TVS transistor.

In a stable working process of the protected circuit, the surge in the protected device disappears. Because the data signal transmitted on the connection port has a relatively high frequency, for example, the frequency of the data signal is usually greater than 500 MHz, most of energy of the data signal is an alternating component. When the alternating component passes through the capacitor 201, the capacitor 201 does not filter the alternating component, so that a relatively entire data signal can pass through the capacitor 201. The maximum voltage of the data signal is less than the clamping voltage of the TVS transistor 202. Therefore, the impedance of the TVS transistor instantly becomes higher. Consequently, the TVS transistor is in a non-conductive state.

According to the interface protection circuit provided in this embodiment of the present invention, the capacitor and the TVS transistor are disposed in the interface protection circuit, and the capacitor is located between the connection port and the TVS transistor. In the foregoing process, a protection capability for the interface chip can be improved without increasing power of the interface protection circuit, so that the protection capability for the interface chip is improved while quality of a data signal transmitted between devices is ensured. Further, the capacitor can reduce the energy of the surge, so that the energy of the surge flowing to the TVS transistor is reduced, and the TVS transistor can be further protected, thereby improving reliability of the interface protection circuit.

Based on the embodiment shown in FIG. 2, optionally, a resistor may be further disposed in the interface protection circuit, and the resistor is connected in series to the capacitor and the interface chip. In this way, voltage division may be performed on the resistor and the interface chip, to reduce impact of the surge on the interface chip, and further improve a protection effect of the interface protection circuit on the interface chip.

In an actual application process, when the resistor is disposed at a different location in the interface protection circuit, the protection effect of the interface protection circuit on the interface chip is different. The following describes in detail an interface protection circuit including a resistor with reference to embodiments shown in FIG. 3 to FIG. 5.

Figure 3:
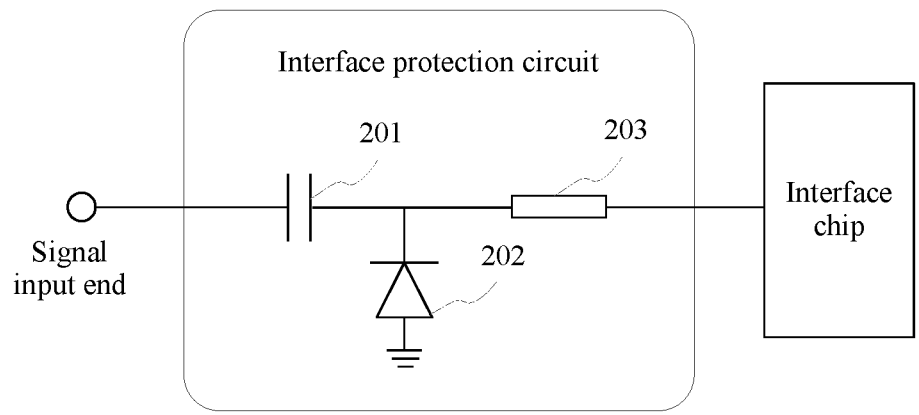
FIG. 3 is schematic structural diagram 2 of an interface protection circuit according to the present invention.

FIG. 3 is schematic structural diagram 2 of an interface protection circuit according to the present invention. Based on the embodiment shown in FIG. 2, refer to FIG. 3. The interface protection circuit further includes a resistor 203. The resistor 203 is disposed between the first end of the TVS transistor 202 and the interface chip.

In an actual application process, when a resistance value of the resistor 203 is excessively small, a protection effect of the resistor on the interface chip is not obvious. When the resistance value of the resistor 203 is excessively large, the resistor 203 causes relatively strong interference to the data signal transmitted on the connection port. Optionally, the resistance value of the resistor 203 is usually between a first resistance value and a second resistance value. The first resistance value is greater than the second resistance value. Optionally, the first resistance value is greater than 1 ohm, and the second resistance value is less than 200 ohms. Optionally, the resistance value of the resistor 203 may be 50 ohms.

The following describes in detail a working process of the interface protection circuit shown in the embodiment in FIG. 3.

When relatively strong surge is generated in a protected circuit, the capacitor 201 first filters out a direct current portion in the surge, to reduce energy of the surge. The surge passing through the capacitor 201 passes through the conductive TVS transistor 202 and then is grounded, so that the TVS transistor 202 clamps the voltages at both ends of the TVS transistor 202 to a low voltage. The interface chip is connected in series to the resistor 203. Therefore, a sum of voltages at both ends of the interface chip and voltages at both ends of the resistor 203 is equal to the voltages at both ends of the TVS transistor 202. Voltage division may be performed on the resistor 203 and the interface chip. Therefore, a surge voltage at both ends of the interface chip may be reduced, to further reduce impact of the surge on the interface chip.

In a process in which the connection port stably sends a data signal to the interface chip, for a process in which the capacitor 201 and the TVS transistor 202 process data information, refer to the embodiment shown in FIG. 2. After the data signal passes through the capacitor 201, because the TVS transistor is non-conductive, the data signal passing through the capacitor 201 flows to the interface chip after passing through the resistor 203. The resistance value of the resistor is less than the second resistance value. Therefore, the resistor has relatively small impact on the data signal.

In the embodiment shown in FIG. 3, the resistor 203 is disposed between the TVS transistor 202 and the interface chip. In this way, when relatively strong surge is generated because of the data signal sent by the connection port, voltage division may be performed on the resistor 203 and the interface chip, to reduce surge voltages at both ends of the interface chip, and further reduce impact of the surge on the interface chip. In a stable working process of the protected circuit, the resistance value of the resistor is less than the second resistance value. Therefore, the resistor has relatively small impact on the data signal.

Figure 4:
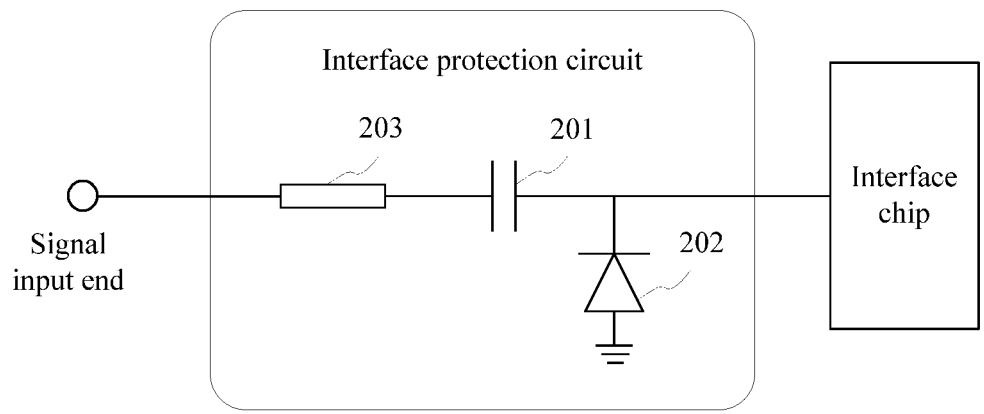
FIG. 4 is schematic structural diagram 3 of an interface protection circuit according to the present invention.

FIG. 4 is schematic structural diagram 3 of an interface protection circuit according to the present invention. Based on the embodiment shown in FIG. 2, refer to FIG. 4. The interface protection circuit further includes a resistor 203. The resistor 203 is disposed between the connection port and the first end of the capacitor 201.

It should be noted that a characteristic of the resistor shown in the embodiment in FIG. 4 is similar to a characteristic of the resistor shown in the embodiment in FIG. 3. Details are not described herein again.

The following describes in detail a working process of the interface protection circuit shown in the embodiment in FIG. 4.

When relatively strong surge is generated in a protected device, the surge passes through the resistor 203, the capacitor 201, and the TVS transistor 202, and then is grounded (for a specific reason, refer to the embodiment shown in FIG. 2). Before the surge flows to the TVS transistor 202, the surge first passes through the resistor 203, to reduce energy of the surge flowing to the capacitor 201. The capacitor 201 filters out a direct current portion in the surge, to further reduce the energy of the surge flowing to the TVS transistor 202. In the foregoing process, a protection capability for the interface chip can be improved without increasing power of the TVS transistor, so that the protection capability for the interface chip is improved while quality of a data signal transmitted between devices is ensured. In this way, the TVS transistor can be better protected by using both the resistor 203 and the capacitor 201, to further improve reliability of a protection circuit.

In a stable working process of a protected circuit, for a process in which the capacitor 201 and the TVS transistor 202 process data information, refer to the embodiment shown in FIG. 2. Specifically, after passing through the resistor 203, the data signal transmitted on the connection port flows to the interface chip. A resistance value of the resistor is less than a second resistance value. Therefore, the resistor has relatively small impact on the data signal.

In the embodiment shown in FIG. 4, the resistor 203 is disposed between the connection port and the first end of the capacitor 201. In this way, when relatively strong surge is generated in the protected device, the resistor 203 and the capacitor 201 may reduce energy of the surge flowing to the TVS transistor 202, thereby improving a protection effect on the TVS transistor, and further improving reliability of the protection circuit. In a stable working process of the protected circuit, the resistance value of the resistor is less than the second resistance value. Therefore, the resistor has relatively small impact on the data signal.

Figure 5:
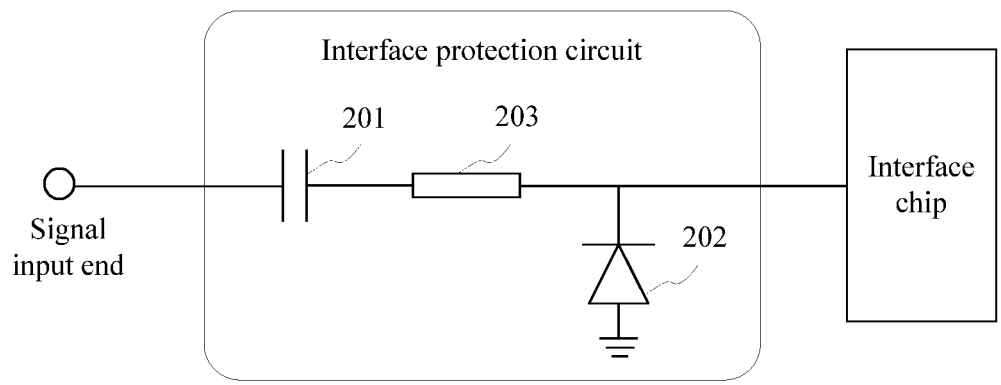
FIG. 5 is schematic structural diagram 4 of an interface protection circuit according to the present invention.

FIG. 5 is schematic structural diagram 4 of an interface protection circuit according to the present invention. Based on the embodiment shown in FIG. 2, refer to FIG. 5. The interface protection circuit further includes a resistor 203. The resistor 203 is disposed between the second end of the capacitor and the first end of the TVS transistor.

It should be noted that a characteristic of the resistor shown in the embodiment in FIG. 5 is similar to a characteristic of the resistor shown in the embodiment in FIG. 3. Details are not described herein again.

It should be further noted that, for a working process and an achieved beneficial effect of the interface protection circuit shown in the embodiment in FIG. 5, refer to the embodiment shown in FIG. 4. Details are not described herein again.

Based on any one of the foregoing embodiments, optionally, to further improve a protection effect of the interface protection circuit on the interface chip, two TVS transistors may be disposed in the interface protection circuit. The interface protection circuit shown in the embodiment in FIG. 3 is used as an example. Another TVS transistor may be disposed between the resistor 203 and the interface chip. For details, refer to an embodiment shown in FIG. 6.

Figure 6:
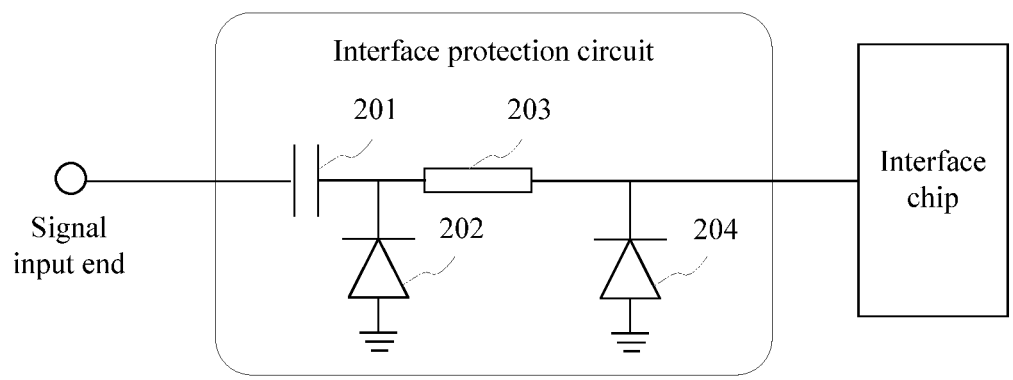
FIG. 6 is schematic structural diagram 5 of an interface protection circuit according to the present invention.

FIG. 6 is schematic structural diagram 5 of an interface protection circuit according to the present invention. Based on the embodiment shown in FIG. 3, referring to FIG. 6, the interface protection circuit further includes a TVS transistor 204. One end of the TVS transistor 204 is disposed between the resistor 203 and the interface chip, and the other end of the TVS transistor 204 is grounded.

Optionally, a characteristic of the TVS transistor 204 may be the same as a characteristic of the TVS transistor 202.

The TVS transistor 204 may further reduce surge voltages at both ends of the interface chip, so that an effect of protection for the interface chip can be improved. Further, when one TVS transistor is faulty, the interface chip may be protected by using the other TVS transistor, thereby improving reliability of the protection for the interface chip.

Certainly, in an actual application process, a location of the TVS transistor in the interface protection circuit and a quantity of TVS transistors in the interface protection circuit may be further set based on an actual requirement. This is not specifically limited in this embodiment of the present invention.

Figure 7:
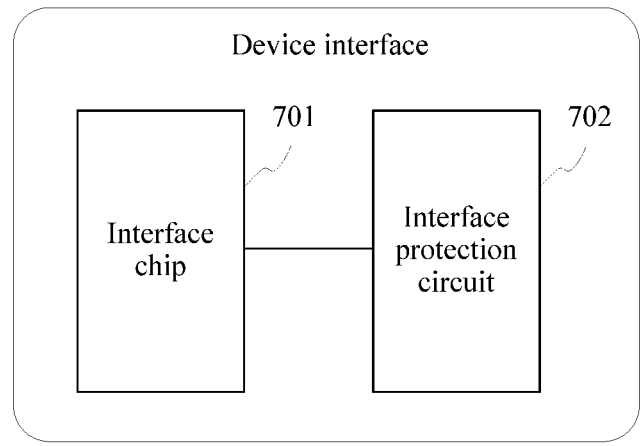
FIG. 7 is a schematic structural diagram of a device interface according to the present invention.

FIG. 7 is a schematic structural diagram of a device interface according to the present invention. Referring to FIG. 7, the device interface includes an interface chip 701 and an interface protection circuit 702 according to any one of the embodiments in FIG. 2 to FIG. 6.

Optionally, the device interface in the embodiment in FIG. 7 may be disposed in a communications device. The communications device may be a computer, a television, a display, a set top box, or the like. In an actual application process, when surge is generated in the circuit, the surge first passes through the interface protection circuit 702, and then flows to the interface chip 701, so that the interface chip 701 can be protected by using the interface protection circuit 702.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An interface protection circuit, comprising:
   a capacitor; and
   a transient voltage suppressor (TVS) transistor;
   wherein a first end of the capacitor is connected to a connection port of a protected device, and wherein a second end of the capacitor is connected to a first end of the TVS transistor and an interface chip of the protected device;
   wherein a second end of the TVS transistor is grounded, wherein the TVS transistor is the only component in the interface protection circuit that has an end that is grounded, and wherein the TVS transistor is connected in parallel with the interface chip such that voltages at both ends of the interface chip are equal to the voltages at both ends of the TVS transistor; and wherein a clamping voltage of the TVS transistor is greater than a maximum voltage of a data signal transmitted on the connection port.

2. The interface protection circuit according to claim 1, further comprising:
a resistor connected in series with the capacitor and the interface chip.

3. The interface protection circuit according to claim 2, wherein the resistor is disposed between the first end of the TVS transistor and the interface chip.

4. The interface protection circuit according to claim 2, wherein the resistor is disposed between the connection port and the first end of the capacitor.

5. The interface protection circuit according to claim 2, wherein the resistor is disposed between the second end of the capacitor and the first end of the TVS transistor.

6. The interface protection circuit according to claim 2, wherein a resistance value of the resistor is between a first resistance value and a second resistance value, wherein, the first resistance value is greater than the second resistance value, wherein the first resistance value is greater than 1 ohm, and wherein the second resistance value is less than 200 ohms.

7. The interface protection circuit according to claim 1, wherein a capacitance value of the capacitor has an inverse relationship with a frequency of a data signal transmitted on the connection port.

8. The interface protection circuit according to claim 1, wherein the connection port is configured to receive a data signal transmitted on the connection port at a frequency higher than 500 MHz, and wherein the connection port is configured to connect to a connection component, wherein the data signal is transmitted over the connection component from a another device having another interface protection circuit.

9. The interface protection circuit according to claim 1, wherein the TVS transistor is a unidirectional TVS transistor, and wherein a negative electrode of the TVS transistor is connected to the connection port.

10. The interface protection circuit according to claim 1, wherein a capacitance value of the capacitor is greater than 0.1 nanofarad and less than 1 microfarad.

11. A device interface, comprising:
an interface chip; and
an interface protection circuit, the interface protection circuit comprising:
a capacitor; and
a transient voltage suppressor (TVS) transistor;
wherein a first end of the capacitor is connected to a connection port of a protected device, and wherein a second end of the capacitor is connected to a first end of the TVS transistor and an interface chip of the protected device; and
wherein a second end of the TVS transistor is grounded, wherein the TVS transistor is the only component in the interface protection circuit that has an end that is grounded, and wherein the TVS transistor is connected in parallel with the interface chip such that voltages at both ends of the interface chip are equal to the voltages at both ends of the TVS transistor; and wherein a clamping voltage of the TVS transistor is greater than a maximum voltage of a data signal transmitted on the connection port.

12. The device interface according to claim 11, wherein the interface protection circuit further comprises a resistor connected in series to the capacitor and the interface chip.

13. The device interface according to claim 12, wherein the resistor is disposed between the first end of the TVS transistor and the interface chip.

14. The device interface according to claim 12, wherein the resistor is disposed between the connection port and the first end of the capacitor.

15. The device interface according to claim 12, wherein the resistor is disposed between the second end of the capacitor and the first end of the TVS transistor.

16. The device interface according to claim 12, wherein a resistance value of the resistor is between a first resistance value and a second resistance value, wherein the first resistance value is greater than the second resistance value, wherein the first resistance value is greater than 1 ohm, and wherein the second resistance value is less than 200 ohms.

17. The device interface according to claim 11, wherein a capacitance value of the capacitor has an inverse relationship with a frequency of a data signal transmitted on the connection port, and wherein the connection port is configured to connect to a connection component, wherein the data signal is transmitted over the connection component from a another device having another interface protection circuit.

18. An interface protection circuit, comprising:
a capacitor; and
a transient voltage suppressor (TVS) transistor;
wherein a first end of the capacitor is connected to a signal input end that is configured to be connected to a connection port of a protected device, and wherein a second end of the capacitor is connected to a first end of the TVS transistor and is configured to be connected at a first port to an interface chip of the protected device with the interface chip connected in parallel with the TVS transistor such that voltages at both ends of the interface chip are equal to the voltages at both ends of the TVS transistor, and wherein a clamping voltage of the TVS transistor is greater than a maximum voltage of a data signal transmitted on the connection port; and
wherein a second end of the TVS transistor is directly connected to a ground port, and wherein the TVS transistor is the only component in the interface protection circuit that has an end that connected to the ground port.

19. The interface protection circuit according to claim 18, further comprising:
a resistor connected in series with the capacitor and the interface chip;
wherein the resistor is one of:
disposed between the first end of the TVS transistor and the first port;
disposed between the signal input end and the first end of the capacitor; or
disposed between the second end of the capacitor and the first end of the TVS transistor.

* * * * *